Patented Apr. 1, 1924.

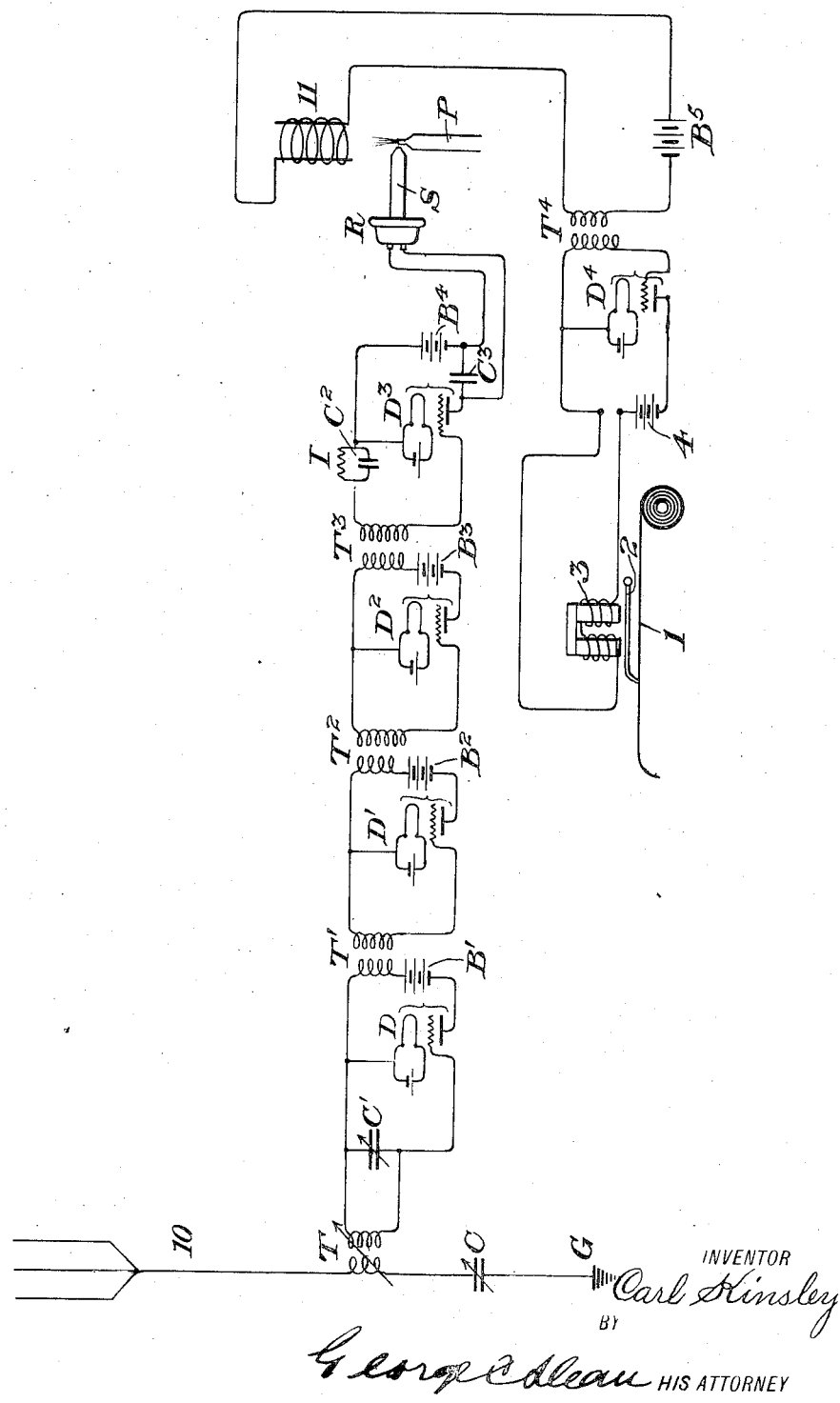

1,488,790

UNITED STATES PATENT OFFICE.

CARL KINSLEY, OF NEW YORK, N. Y.

SPACE-TELEGRAPH AMPLIFYING AND RECORDING SYSTEM AND METHOD THEREFOR.

Application filed March 29, 1920. Serial No. 369,617. Renewed August 25, 1923.

*To all whom it may concern:*

Be it known that I, CARL KINSLEY, a citizen of the United States, and resident of New York city, in the county of New York and State of New York, have invented certain new and useful Improvements in Space-Telegraph Amplifying and Recording Systems and Methods Therefor, of which the following is a specification.

My present invention relates more particularly to space telegraph systems of the type disclosed in the application of Ray E. Hall, Serial No. 301,010, filed May 31st, 1919, and issued as Patent No. 1,378,345, dated May 17, 1921.

For purposes of my present invention, it is sufficient to say that said Hall application discloses a receiving system in which the received energy is amplified by suitable means, as for instance, an audion or other vacuum tube operating to produce uni-directional fluctuations of a battery corresponding to the received waves. Where the sending station employs a spark discharge or a rotary interrupter the wave trains will be the frequency of the spark or of the interrupter as the case may be. Where the sending station radiates continuous wave trains broken in accordance with the dots and dashes or analogous code elements, their continuity may be broken up into much shorter lengths to produce battery fluctuations of a desired frequency or an equivalent effect may be obtained by superposing on the received energy, waves of a slightly different frequency, thereby producing an electrical heterodyne. These methods are well known in the art. Moreover, as described in said Hall application, the received energy may be applied at radio frequency if the wave length employed is long enough.

The resultant battery fluctuations produced in any of the above ways are applied by Hall to produce vibrations of a telephone diaphragm and the resulting acoustic vibrations are applied to precipitate breaking or bushing of a sensitive jet, preferably an air jet preferably adjusted so as to be especially sensitive to sound vibrations of the same frequency as the battery fluctuations. The sensitive jet in its normal unbroken condition discharges in proximity to a sensitive resistance, preferably along the axis of a coil of very fine wire, kept normally hot by flow of battery current therethrough. The bushing of the jet spreads the air stream into contact with the hot wire, lowering the resistance thereof, thereby producing increase of battery current flow.

In practice, there are certain situations where the received energy is so small that current vibrations obtainable in this way vary from about 1 to 1.2 ampere as the maximum outside ranges between which operation is obtained. This varying current flow may be utilized directly but my present invention contemplates operating a recorder. For this purpose, I use the fluctuations in the fine wire circuit of the Hall apparatus in the primary of a transformer, preferably a step up transformer, the secondary of which is in operative relation to an audion or similar vacuum tube amplifier. The fluctuations of battery current produced in this latter circuit are of magnified power and are applied directly to operate the recorder.

A system embodying my improvement on the Hall system is indicated in the accompanying drawings in which the figure is a diagrammatic view of the receiving system.

In these drawings the indicator to be operated may be a recorder with a continuous moving tape 1, for contact of pivoted stylus 2, operated by a magnet 3 which is energized by fluctuations of current from battery 4. Such fluctuations of battery 4 may be made of amplified strength, varied in accordance with the received signal, as follows:

The incoming signal waves are received by any desired form of collecting wire, in this case, diagrammatically indicated as antenna 10, grounded at D through adjustable condenser C. Such receiving wire is usually tuned to the frequency of the received waves which may be say 100,000 per second or say 35,000 per second as the case may be. If the incoming signals are powerful enough and of low enough frequency, the energy received in 10 may be applied directly to the telephone receiver R. In most cases, however, the energy will be applied through adjustable transformer T having its secondary in a circuit including adjustable condenser C' whereby the secondary circuit is tuned to the frequency of the received waves. This circuit is connected with the hot wire and grid elements of the audion, diagrammatically indicated at D, or with corresponding elements of any other desired amplifier. These variations thus applied cause corresponding fluctuations of flow of battery B' connected to the plate element of the amplifier. These fluctuations may be applied through successive transformers T', T$^2$, T$^3$ to successive audions D', D$^2$, D$^3$ producing amplified fluctuations of the respective batteries B$^2$, B$^3$, B$^4$.

In the form shown, the final circuit, in this case T$^3$, D$^3$, includes inductance I and condenser C$^2$ arranged in parallel and constituting a supplemental circuit tuned to a frequency slightly different from that of the received waves to produce in conjunction therewith an electrical heterodyne, of desired frequency. Thus if the desired frequency for operating telephone or other receiver R is 5000, the frequency of circuit I C$^2$ will be the received frequency (100,000 or 35,000 or any other) plus or minus 5000. If desired, a condenser C$^3$ may be employed in shunt to the coil of receiver R and may be adjusted for resonant energizing of the latter at the 5000 frequency.

The special form of receiving wire and amplifying circuits is not important and any other known or desired system may be employed for energizing receiver R at the desired frequency.

In the particular arrangement here selected for purposes of illustration, the fluctuations in the coil of receiver R will vibrate the diaphragm thereof at the 5000 frequency producing acoustic waves or sounds of said frequency which may be applied through tube S at the base of the sensitive jet flowing from pipe P. Tube S may be designed for acoustic resonance at the 5000 frequency and the air jet may be made particularly sensitive to said frequency by proper design of the shape and size of the jet nozzle and adjustment of the air pressure through pipe P.

With this arrangement the jet will normally tend to flow in a smooth comparatively untroubled column, but upon energizing of telephone receiver R, it will break or bush in response to the air wave variations applied through tube S. This change of the jet is utilized to variably cool a sensitive resistance. This may consist of a very fine platinum wire coil 11 arranged so that the normal, unbroken jet flows smoothly through the same along the axis thereof. The wire is normally heated to high temperature by battery B$^5$ but bushing of the jet spreads it into cooling relation to the wire, thereby reducing its resistance and producing momentarily increased flow of current from battery B$^5$.

Instead of applying these fluctuations directly to the operation of an indicator, I apply them to the primary of transformer T$^4$ having its secondary in operative relation to an audion or similar amplifier D$^4$ which operates to produce the desired amplified fluctuations of battery 4. These fluctuations thus amplified are sufficient to operate recorders of much less sensitiveness and of correspondingly greater reliability than those heretofore employed.

By employing platinum wire as the material for the sensitive resistance 11, the latter may be maintained at white heat by the amount of current flowing normally from the battery B$^5$ thus making the temperature difference between the resistance and the cooling air very great and the cooling correspondingly rapid. By causing the battery current to flow in parallel through the several turns of the coil a very considerable current may be used even when the wire is extremely fine as in the case of the well known Wollaston wire, which I prefer to employ. By these several expedients the time constant of change of temperature of the wire upon bushing of the jet is made very small and the time rate of change of current flowing in the circuit correspondingly great. Thus the battery current variations act very effectively in producing corresponding alternating currents of higher voltage in the secondary of transformer T$^4$. I believe I am the first to discover this adaptability as well as the first to utilize it in the manner above described.

The transformer T$^4$ may be and preferably is a step up transformer, as preferably also the other transformers T, T', T$^2$ and T$^3$.

I claim:

1. A transformer, a translating device in the secondary circuit thereof, in combination with means for energizing the primary circuit thereof, said means comprising a sensitive resistance, a battery normally heating said resistance to high temperature, means for maintaining a sensitive jet normally flowing in proximity to said sensitive resistance in position to impinge thereon and cool the same when the jet is broken down or bushed and means for periodically causing such breaking down or bushing.

2. In the combination specified by claim 1, the feature of having the translating device in the secondary circuit of the transformer, a battery and amplifier of the type responsive to alternating current to thereby produce amplified fluctuations of the battery and means actuated by said battery fluctuations to produce an indication or effect.

3. The method of producing alternating currents which consists in establishing normally continuous flow of direct current through the primary of a transformer and causing rapid variations of such current by causing the same to flow through a resistance of very small mass to normally maintain the same at very high temperature and varying said temperature by periodically applying a cooling medium to said resistance.

4. In the method specified by claim 3, the further feature of employing as the cooling medium a sensitive jet normally directing the same in proximity to said resistance; and applying vibratory energy of definite frequency for periodically bushing or breaking the jet to cause impingement thereof on said resistance.

Signed at New York city, in the county of New York, and State of New York, this 5th day of March, A. D. 1920.

CARL KINSLEY.